Figures 8, 9:
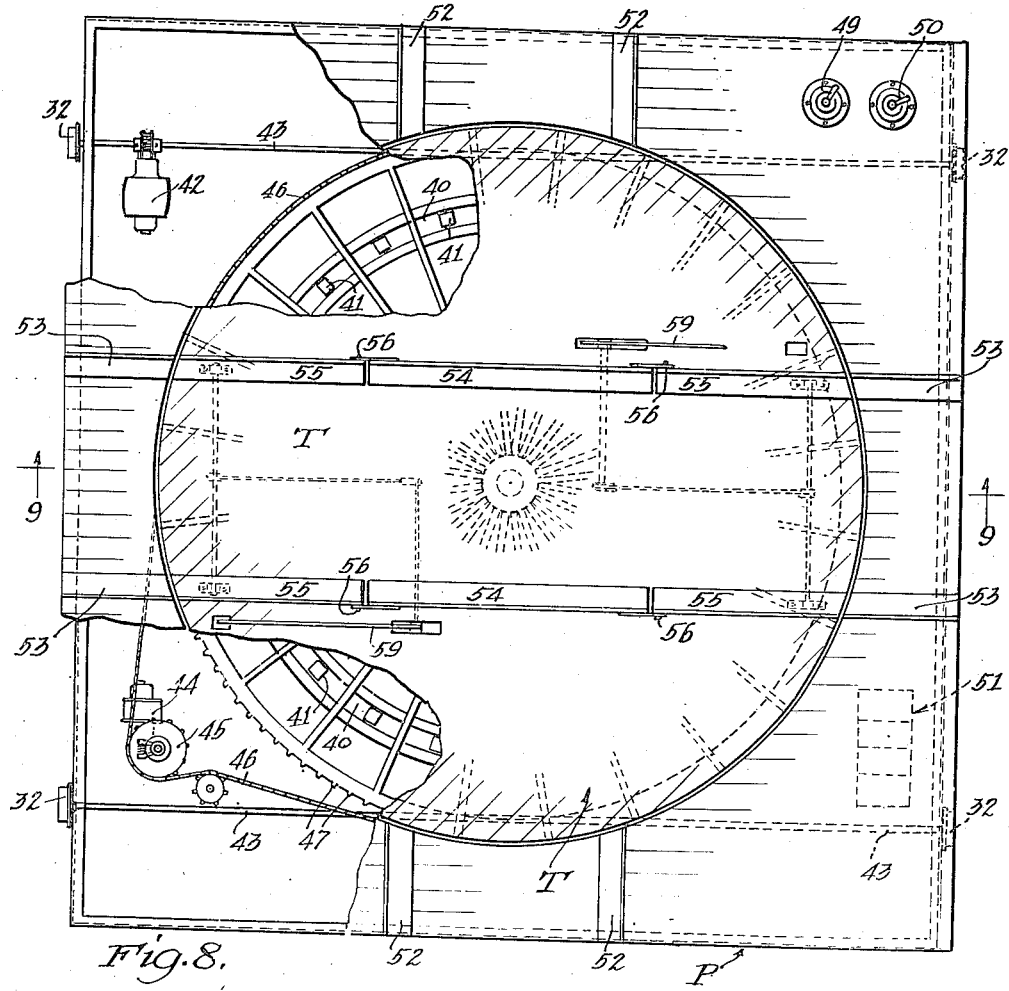

Sept. 18, 1923.
E. M. FRASIER
AUTOMOBILE STORAGE
Filed June 6, 1922 4 Sheets-Sheet 1
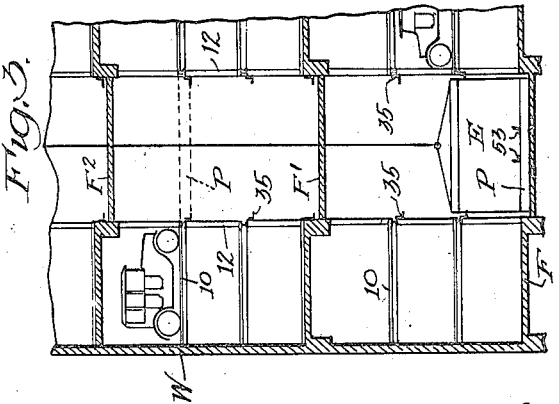
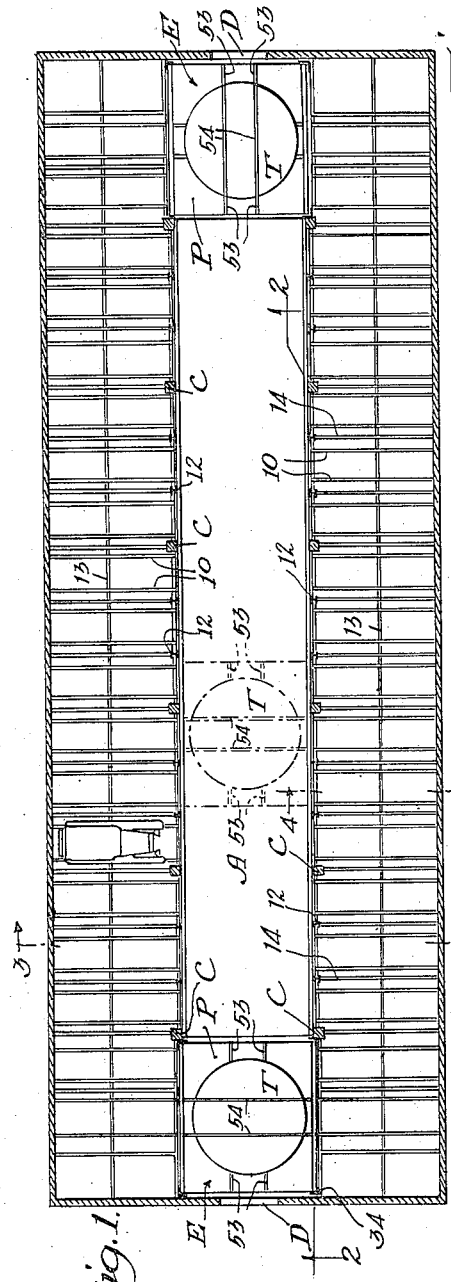
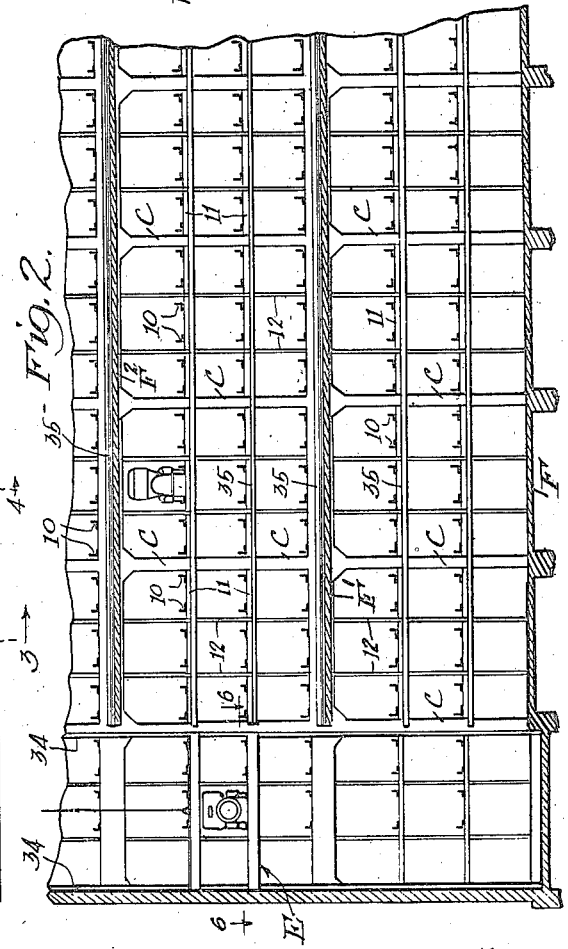
Inventor:
Emory Melvon Frasier,
By James T. Barkelew
his Attorneys

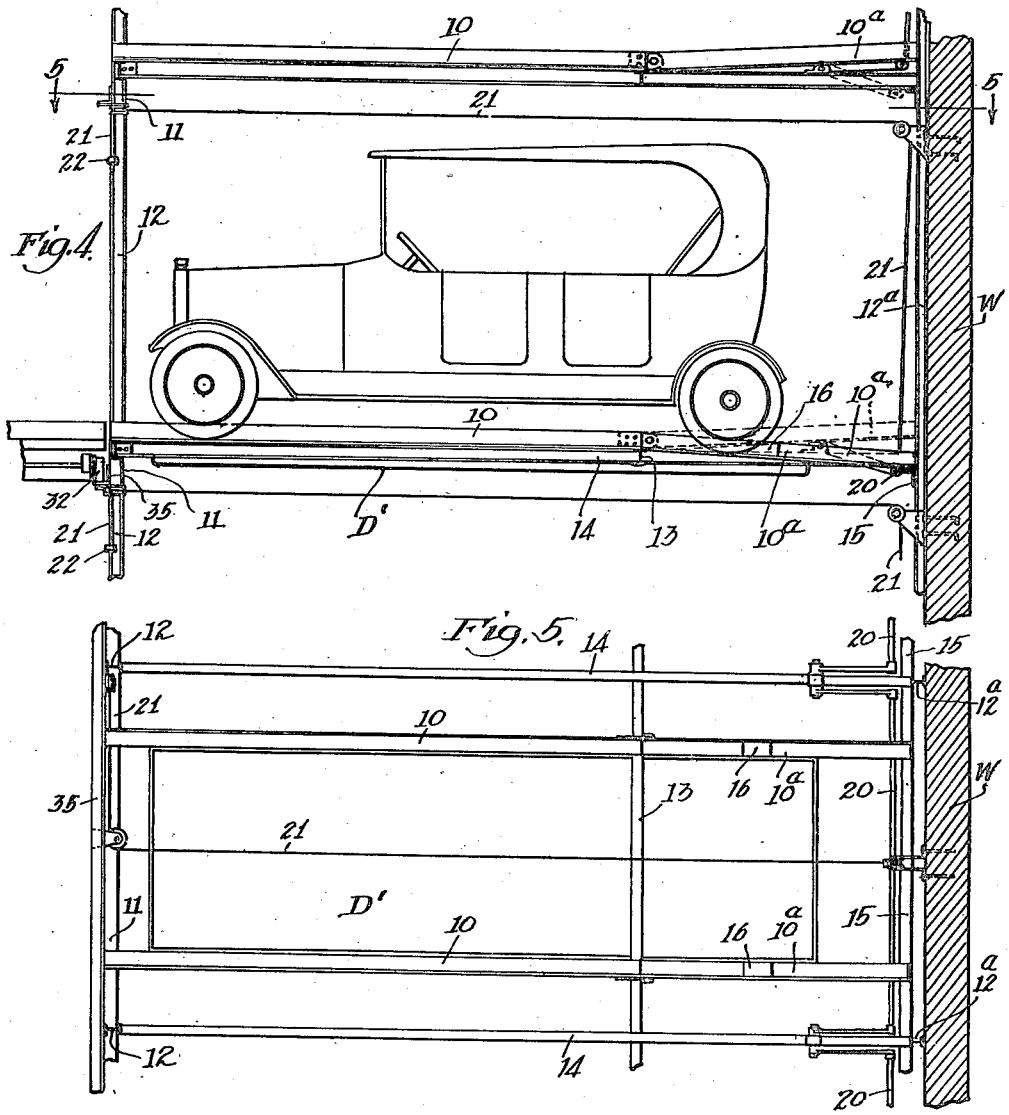

Sept. 18, 1923.
E. M. FRASIER
AUTOMOBILE STORAGE
Filed June 6, 1922     4 Sheets-Sheet 3
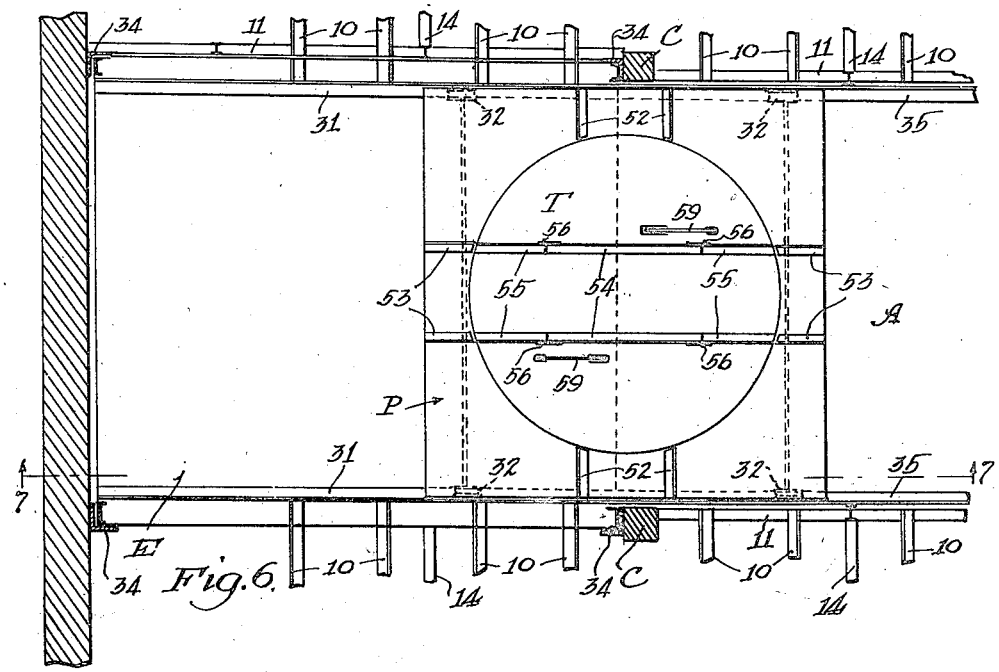
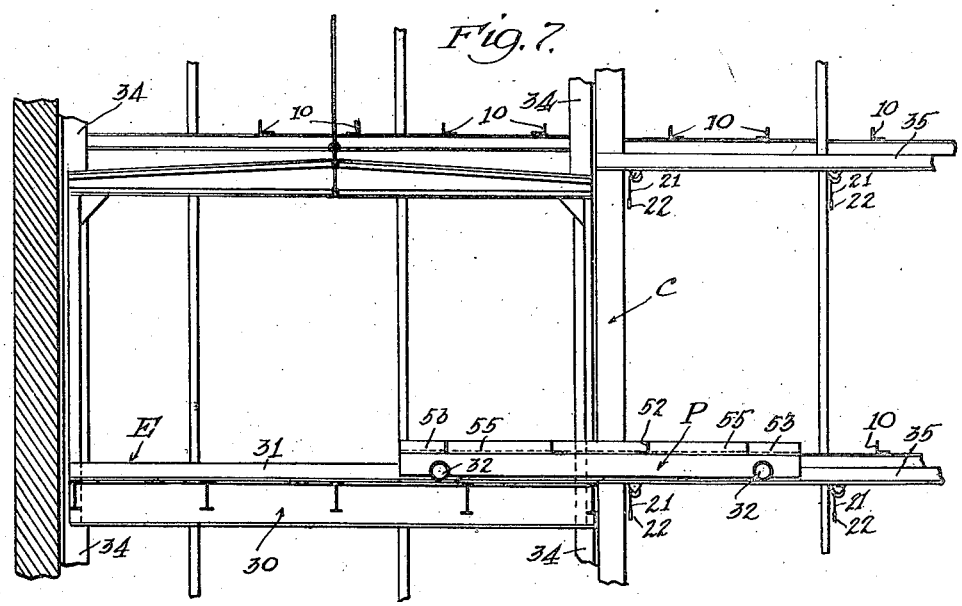
Inventor:
Emory Melvon Frasier,
By his Attorneys Sept. 18, 1923.

E. M. FRASIER

AUTOMOBILE STORAGE

Filed June 6, 1922

1,468,147

4 Sheets-Sheet 4

Inventor:
Emory Melvon Frasier
By James T. Barkeley
his Attorneys

Patented Sept. 18, 1923.

1,468,147

UNITED STATES PATENT OFFICE.

EMORY MELVON FRASIER, OF LOS ANGELES, CALIFORNIA, ASSIGNOR TO ISABEL A. FRASIER, OF LOS ANGELES, CALIFORNIA.

AUTOMOBILE STORAGE.

Application filed June 6, 1922. Serial No. 566,282.

*To all whom it may concern:*

Be it known that I, EMORY MELVON FRASIER, citizen of the United States, residing in Los Angeles, county of Los Angeles, State of California, have invented new and useful Improvements in Automobile Storage, of which the following is a specification.

This invention has to do with structures built for the purpose of storing automobiles and the like; relating to such structures as are commonly known as storage garages. And it is one of the principal objects of the invention to provide a structure in which automobiles may be safely stored with a maximum utilization of storage space; and so that the automobiles may be easily and expeditiously handled to put them in and take them out of storage. There are many other objects and corresponding accomplishments of the invention; but all of these will be best understood from a more or less detailed description of a specific and preferred form of structure and apparatus that involves the invention.

In the specific form of structure herewith illustrated and herein described, I make an arrangement of automobile receiving stalls in superimposed rows. The number of rows of stalls thus superimposed may vary; but, regardless of the number of superimposed rows, a single elevator gives access to all of the rows of stalls. For purpose of expeditiously handling automobiles, more than one elevator may be used, depending upon the storage capacity of the structure. Each elevator is designed to carry a mobile platform; and the structure is provided with tracks running along each row of stalls; so that when the elevator has been raised to proper height then this mobile platform may be moved off the elevator onto any set of tracks. Then this platform may be moved down the tracks to a position in front of any particular stall, and the automobile may be run into the stall off the platform or run out of the stall onto the platform.

Preferably, the elevator is arranged at an end of the structure; and it may be preferable to have the entrance door also through the end wall of the structure; so that when an automobile is run onto a platform on the elevator, it is then moving in a direction longitudinal of the alley-way on which the stalls front. Thus in this arrangement it becomes necessary to turn the automobile through an angle of 90° in order to roll it into a stall; and for that purpose the platform is provided with a turntable.

Other devices and apparatus are also provided for ease of handling the cars; but all of these things will best appear in the following detailed description, reference for which purpose is had to the accompanying drawings, in which—

Fig. 1 is a plan section of a typical structure embodying my automobile storage; Fig. 2 is a partial elevational section taken on line 2—2 on Fig. 1; Fig. 3 is a cross section taken on line 3—3 on Fig. 1; Fig. 4 is an enlarged vertical section taken on line 4—4 on Fig. 1; Fig. 5 is a horizontal section taken on line 5—5 on Fig. 4; Fig. 6 is an enlarged horizontal section taken on line 6—6 on Fig. 2; Fig. 7 is a vertical section taken on line 7—7 of Fig. 6; Fig. 8 is an enlarged plan, with parts broken away, of the mobile platform with its turntable; and Fig. 9 is a section on line 9—9 of Fig. 8.

In the drawings I have illustrated a structure wherein two tiers of stalls front on a central alleyway A. In the alleyway I have shown two elevators one at each end as indicated at E. However, it will be understood that this arrangement may be varied to suit circumstances although this arrangement of having two tiers of stalls facing into a single central alleyway is the most economical of space. But, for instance in a space that is restricted in width so that a very narrow structure would have to be used, then a single tier of stalls may face into an alleyway on one side only. Furthermore, it is of course not necessary to place the elevators at the ends of the alleyway although I consider this location the most convenient as the elevator is then located near the door D so that when a car drives into the door it may drive directly onto the mobile platform P. There is at least one such platform for each elevator and there may be as many more as is found convenient or as the size of the building and needs of the service require.

I have shown a structure in which the tiers of stalls (the superimposed lines of stalls) are arranged between floors of the buildings; and in this particular instance I have chosen to arrange three lines of stalls in the space between the successive floors F, $F^1$ and $F^2$, but as will be readily understood from this specification this arrangement may be varied quite completely without in the least varying the invention. I may arrange either one or as many lines of stalls as desired between successive floors; and it is possible in my structure to utilize a tall building and merely arrange the skeleton stall lines from floor to roof without any intervening floors at all. However, it is convenient to have a floor occasionally; and the floors also cut down the fire risk. In a properly constructed steel or concrete building any fire that might start in one automobile can be effectively confined by the floors.

In the designs shown in these drawings the floors $F^1$ and $F^2$ are supported by the side walls W and by columns C. The stalls themselves are of skeleton form, having no solid floor or side walls, except a sheet metal floor or drip pan to prevent dripping on the car below. These pans are shown at $D^1$. The tracks to receive an automobile are made of angle iron as shown at 10, properly spaced to receive a machine. The forward ends of these angle iron tracks are supported on a beam 11 that runs along the floor of the lines of stalls; these beams 11 being supported on I-beam 12. The rear ends of tracks 10 are supported on another beam 13 that extends along the line of stalls near its rear end, this beam 13 being supported on other beams 14 that extend from columns 12 lengthwise of the stalls and back to the wall W where they are supported on columns $12^a$. Likewise there is also supported on columns $12^a$ a longitudinal stringer 15, preferably an angle iron, that forms the support for the extreme rear ends of movable track portions $10^a$ when those portions are in their lowermost positions. When a car is rolled into a stall these track portions $10^a$ are lowered so that when the rear wheels of the car roll onto the then rearwardly inclined track portion (as shown in full lines in Fig. 4) the car will tend to roll back until it strikes a suitable stop. For this purpose for instance, blocks 16 may be set in tracks $10^a$. Also this rearward inclination prevents the car from accidentally moving forward and out of the stall. On the other hand when it is desired to roll the car out of the stall the movable tracks $10^a$ are moved forward so as to incline forwardly as shown in dotted lines in Fig. 4. This arrangement, and a similar arrangement on the movable platform, makes it easy to move the cars without having to resort to their own power. Any suitable means may be used for moving tracks $10^a$; I show here a simple arrangement embodying a bar 20 under the rear ends of tracks $10^a$, and a cable 21 extending upwardly and then over forwardly and then laterally to the front corner of the stall where a handle 22 may be provided. Pulling down on the handle will raise tracks $10^a$ and cause the car to roll forwardly.

The general arrangement of the elevator and the mobile platform is shown in Figs. 6 and 7. I use an elevator having a lower frame 30 carrying two track rails 31 on which the wheels or rollers 32 of mobile platform P are adapted to run. This elevator may operate in vertical elevator ways 34 and be hoisted by any suitable means. Extending along the front of each line of stalls I arrange tracks 35, shown here as composed of angle irons. The wheels 32 of the mobile platform are adapted to also run on these tracks, so that the mobile platform may be run off and onto the elevator whenever the elevator is placed so that its tracks 31 register with tracks 35. The platform is shown partially off the elevator in Figs. 6 and 7. This platform is of such size as to completely bridge the open alleyway space between the fronts of the opposite lines of stalls; this alley being made just sufficiently wide to handle the longest car when standing crosswise of it on the platform.

The platform is preferably provided with a turnable T for the purpose of turning a car to a position crosswise of the alleyway after the car is driven onto the platform through the door D in a direction lengthwise of the alley. Of course, it will be immediately recognized to be easy to arrange the building structure so that the door D would be in one of the longitudinal walls of the building rather than in an end wall and so that a car could then be driven onto the platform in a direction at right angles to the extent of the alleyway. In such a case it would not be necessary to have the turntable; except that a turntable is always convenient to turn the car end for end to put it into either side of the structure facing forwardly toward the alleyway. So on the whole I prefer the general arrangement here shown wherein the cars drive through the end door D onto the turntable T and are then elevated to the proper line of stalls and the platform run down the alleyway to the particular stall and the turntable then turned a quarter revolution in whichever direction is proper to back the car into the stall.

The detailed arrangement of the platform and turntable are shown in Figs. 8 and 9. The platform may be constructed in any suitable manner and with any suitable framing to make it sufficiently strong; and it carries a circular track 40 on which the roller bearing supports 41 of the turntable run. The upper face of both platform and turntable may be surfaced in any suitable manner; and the operating mechanism is all contained within the platform. To run the platform along the tracks a small motor 42 operates shaft 43 on which two of the wheels 32 are mounted. Another motor 44 operates a sprocket wheel 45 to run a sprocket chain 46 that extends around the turntable, the periphery of the turntable being provided with sprocket teeth 47 for this purpose. These two motors may be conveniently controlled from hand controllers 49 and 50 mounted on the platform, and supplied with energy from a battery 51 also mounted in the platform.

The platform and turntable carry tracks to receive and guide an automobile. The platform outside the edge of the turntable has two sets of tracks 52 and 53 adapted to register with the turntable track in either of its positions. All these tracks are preferably formed of angle iron. On the turntable these angle iron tracks have a central stationary portion 54 and two vertically movable end portions 55 pivoted at their inner ends at 56 and with their outer ends free to be moved up and down by toggle arrangements 57 which operate in the well known manner. These toggles 57 are operated through the medium of connecting rods 58 from hand levers 59 which normally lie down flat on the turntable floor. Pulling up on either one of these handles and raising the corresponding ends of the tracks on the turntable will roll the car away from the raised end. Thus when the platform has been brought opposite the proper stall and the turntable turned in the proper direction, then lifting of the ends of the turntable tracks at the front end of the car will roll the car back into the stall. At this time the vertically movable track parts 10$^a$ in the stalls are down; so that when the rear wheels reach these rearwardly inclined parts of the track the car then rolls on back until it strikes the stop blocks 16, and then remains there securely in position. The manner of removing a car from its stall and delivering it to a person at door D will be readily understood without the necessity of further description.

Having described a preferred form of my invention, I claim:

1. Automobile storage, embodying a structure having superimposed lines of storage stalls fronting on an alleyway, an elevator in the alleyway, a mobile turntable platform adapted to be carried on the elevator; and ways in the structure extending along the alleyways at the levels of the lines of stalls and on which ways the turntable platform is adapted to run.

2. Automobile storage, embodying a structure having superimposed lines of storage stalls fronting on an alleyway, an elevator in the alleyway a mobile turntable platform adapted to be carried on the elevator, and ways in the structure extending along the alleyways at the levels of the lines of stalls and on which ways the turntable platform is adapted to run; the turntable platform carrying a turntable with tracks thereon adapted to take automobile wheels, and each of the stalls having tracks into registration with which the turntable tracks may be placed.

3. Automobile storage, embodying a structure having superimposed lines of storage stalls fronting on an alleyway, trackways extending along the alleyways at the levels of the lines of stalls, an elevator in the alleyway and having trackways adapted to be registered with any of the alley trackways, and a mobile turntable platform adapted to run on any of the trackways and having a turntable for carrying automobiles.

4. Automobile storage, embodying a structure having superimposed lines of storage stalls fronting on an alleyway, trackways extending along the alleyways at the levels of the lines of stalls, an elevator in the alleyway and having trackways adapted to be registered with any of the alley trackways, and a mobile turntable platform adapted to run on any of the trackways, a turntable carried by the platform and having automobile wheel tracks, and each stall having automobile wheel tracks with which the turntable tracks are adapted to be put into registration.

5. Automobile storage, embodying a structure having superimposed lines of storage stalls fronting on an alleyway, trackways extending along the alleyways at the levels of the lines of stalls, an elevator in the alleyway and having trackways adapted to be registered with any of the alley trackways, and a mobile turntable platform adapted to run on any of the trackways, a turntable carried by the platform and having automobile wheel tracks, and each stall having automobile wheel tracks with which the turntable tracks are adapted to be put into registration; a section of the turntable track being vertically movable, to incline an automobile standing on the track, and means to move said section.

6. Automobile storage, embodying a structure having superimposed lines of storage stalls fronting on an alleyway, trackways extending along the alleyways at the levels of the lines of stalls, an elevator in the alleyway and having trackways adapted to be registered with any of the alley trackways, and a mobile turntable platform adapted to run on any of the trackways, a turntable carried by the platform and having automobile wheel tracks, and each stall having automobile wheel tracks with which the turntable tracks are adapted to be put into registration; a rear section of the stall track being vertically movable both above and below normal horizontal position to incline an automobile either rearwardly or forwardly.

7. Automobile storage, embodying a structure having superimposed lines of storage stalls fronting on an alleyway, trackways extending along the alleyways at the levels of the lines of stalls, an elevator in the alleyway and having trackways adapted to be registered with any of the alley trackways, and a mobile turntable platform adapted to run on any of the trackways, a turntable carried by the platform and having automobile wheel tracks and each stall having automobile wheel tracks with which the turntable tracks are adapted to be put into registration; a section of the turntable track being vertically movable to incline an automobile standing on the track, and means to move said section; a rear section of the stall track being vertically movable both above and below normal horizontal position to incline an automobile either rearwardly or forwardly.

8. Automobile storage, embodying a skeleton structure having superimposed lines of skeleton stalls each comprising automobile wheel tracks supported on the skeleton structure, the structure including an alleyway on which the stalls front and including tracks extending along the alleyway at the levels of the lines of stalls; an elevator in the alleyway and a mobile automobile carrying platform adapted to be carried on the elevator and adapted to run on the alleyway tracks.

9. Automobile storage, embodying a skeleton structure having superimposed lines of skeleton stalls each comprising automobile wheel tracks supported on the skeleton structure, the structure including an alleyway on which the stalls front and including tracks extending along the alleyway at the levels of the lines of stalls; an elevator in the alleyway and a mobile automobile carrying platform adapted to be carried on the elevator and adapted to run on the alleyway tracks, said platform having a turntable which has automobile wheel tracks adapted to be put into registration with the stall tracks.

10. Automobile storage, embodying a structure having an alleyway and superimposed lines of stalls on both sides of the alleyway, tracks extending along the alleyway at the levels of the lines of stalls, an elevator in the alleyway, a mobile platform adapted to be carried on the elevator and to run on the alleyway tracks, the platform having automobile wheel tracks and adapted to be placed in registration with the stalls, vertically movable sections of the platform tracks at its opposite ends, and means to move either of said sections to incline an automobile toward the stalls on either side of the alleyway.

In witness that I claim the foregoing I have hereunto subscribed my name this 17th day of May, 1922.

EMORY MELVON FRASIER.